US011796014B2

(12) United States Patent
Komatsu

(10) Patent No.: US 11,796,014 B2
(45) Date of Patent: Oct. 24, 2023

(54) CLUTCH RING AND DIFFERENTIAL WITH A CLUTCH

(71) Applicant: GKN Automotive Limited, Birmingham (GB)

(72) Inventor: Toshiaki Komatsu, Commerce Township, MI (US)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 17/965,895

(22) Filed: Oct. 14, 2022

(65) Prior Publication Data

US 2023/0151855 A1 May 18, 2023

Related U.S. Application Data

(60) Provisional application No. 63/278,823, filed on Nov. 12, 2021.

(51) Int. Cl.

*F16D 27/118* (2006.01)
*F16H 48/24* (2006.01)
*F16H 48/34* (2012.01)

(52) U.S. Cl.

CPC ........... *F16D 27/118* (2013.01); *F16H 48/24* (2013.01); *F16H 2048/346* (2013.01)

(58) Field of Classification Search

None
See application file for complete search history.

(56) References Cited

U.S. PATENT DOCUMENTS 6,165,095 A * 12/2000 Till ......................... F16H 48/34 192/84.2
7,887,450 B2 * 2/2011 Fusegi .................... F16H 48/34 192/84.96
9,797,495 B2 10/2017 Inose et al.
10,385,928 B2 8/2019 Inose et al.
2010/0282563 A1 * 11/2010 Yoshimura ............ B63H 20/20 192/69.8
2022/0268324 A1 * 8/2022 Cioc ....................... F16D 11/14

FOREIGN PATENT DOCUMENTS

WO WO-03046398 A1 * 6/2003 ............. F16D 11/14
WO WO-2016088232 A1 * 6/2016

OTHER PUBLICATIONS

WO2016088232 translation (Year: 2016).*

* cited by examiner

*Primary Examiner* — Timothy Hannon
(74) *Attorney, Agent, or Firm* — Reising Ethington P.C.

(57) ABSTRACT

In at least some implementations, a clutch member includes a main body having a central axis, a radially inner surface, a radially outer surface, a rear face and a front face, multiple teeth formed in the front face with adjacent teeth circumferentially spaced apart, and a rim extending axially from the main body and located radially outwardly of the teeth. The rim extends axially farther from the rear face than do the teeth.

18 Claims, 5 Drawing Sheets

34
98 55
56
58
60
114
116
54
102
49
120
37

CLUTCH RING AND DIFFERENTIAL WITH A CLUTCH

REFERENCE TO RELATED APPLICATIONS

This application claims the benefit of U.S. Provisional Application Ser. No. 63/278,823 filed Nov. 12, 2021. The entire content of this priority application is incorporated herein by reference in its entirety.

TECHNICAL FIELD

The present disclosure relates generally to a clutch ring and a vehicle driveline component, such as a differential, with a clutch having a clutch ring.

BACKGROUND

A vehicle driveline transfers motive power to vehicle wheels. Various driveline components are known. For example, power transfer units are commonly utilized in front-wheel drive based all-wheel drive systems. Power transfer units may include a disconnect device so that power is transferred to only the front wheels during certain vehicle operating conditions and to more and up to all wheels in other vehicle operating conditions. Vehicle drivelines may also include differentials that allow the wheels to spin at different rates while transmitting torque to the wheels.

Some of these driveline devices include a clutch that permits selective torque transfer through the device. The clutch may be driven by an electromagnetic actuator to drive the clutch between engaged and disengaged states. Engaging, disengaging and handling torque requirements can be challenging in designs requiring, for example, reduced weight and/or smaller part sizes.

SUMMARY

In at least some implementations, a clutch member includes a main body having a central axis, a radially inner surface, a radially outer surface, a rear face and a front face, multiple teeth formed in the front face with adjacent teeth circumferentially spaced apart, and a rim extending axially from the main body and located radially outwardly of the teeth. The rim extends axially farther from the rear face than do the teeth.

In at least some implementations, the main body includes multiple feet that extend axially from the rear face. In at least some implementations, the rim is circumferentially continuous. In at least some implementations, a radially outer surface of the rim is radially aligned with and defines part of the outer surface of the main body. In at least some implementations, a front surface of the rim extends radially and circumferentially, and is planar and either: a) perpendicular to the central axis, or b) inclined at an angle that is 45 degrees or less to a plane perpendicular to the central axis.

In at least some implementations, the teeth are defined between adjacent grooves formed in the front face. In at least some implementations, the grooves extend to a radially inner surface of the rim. In at least some implementations, a radially extending intermediate surface is located between the teeth and the rim.

In at least some implementations, the rim extends axially beyond by an amount up to five times the thickness of the rim, where the thickness of the rim is the radial dimension of the rim. In at least some implementations, the axial extent of the rim is equal to or less than the axial extent of a radially outer surface of the main body from the rear face to the front face of the teeth.

In at least some implementations, a rotary power transmission device includes a housing having an interior in which multiple gears are received for rotation, an actuator having a plunger driven for movement along an axis of the plunger between advanced and retracted positions and a clutch assembly, The clutch assembly includes a clutch ring having a front face and a rear face opposite the front face, the front face including teeth selectively engageable with teeth of one of the gears, the clutch ring being driven by the plunger between a first position in which the teeth of the clutch ring are engaged with the teeth of the gear, and a second position in which the teeth of the clutch ring are not engaged with the teeth of the gear, and the clutch ring includes a rim extending axially from the main body and located radially outwardly of the teeth, the rim extending axially farther from the rear face than do the teeth.

In at least some implementations, the main body includes multiple feet that extend axially from the rear face. In at least some implementations, the teeth are defined between adjacent grooves formed in the front face. In at least some implementations, the grooves extend to a radially inner surface of the rim. In at least some implementations, a radially extending intermediate surface is located between the teeth and the rim.

In at least some implementations, the rim is circumferentially continuous. In at least some implementations, a radially outer surface of the rim is radially aligned with and defines part of the outer surface of the main body. In at least some implementations, a front surface of the rim extends radially and circumferentially, and is planar and either: a) perpendicular to the central axis, or b) inclined at an angle that is 10 degrees or less to a plane perpendicular to the central axis. In at least some implementations, the rim extends axially beyond the teeth by an amount up to five times the thickness of the rim, where the thickness of the rim is the radial dimension of the rim. In at least some implementations, the multiple gears include a side gear and a pinion gear that are mated together, and the side gear rotates about the central axis and the rim axially overlaps a portion of the side gear in the both the first position and the second position of the clutch ring.

BRIEF DESCRIPTION OF THE DRAWINGS

The following detailed description of preferred embodiments and best mode will be set forth with reference to the accompanying drawings, in which.

DETAILED DESCRIPTION

Figure 1:
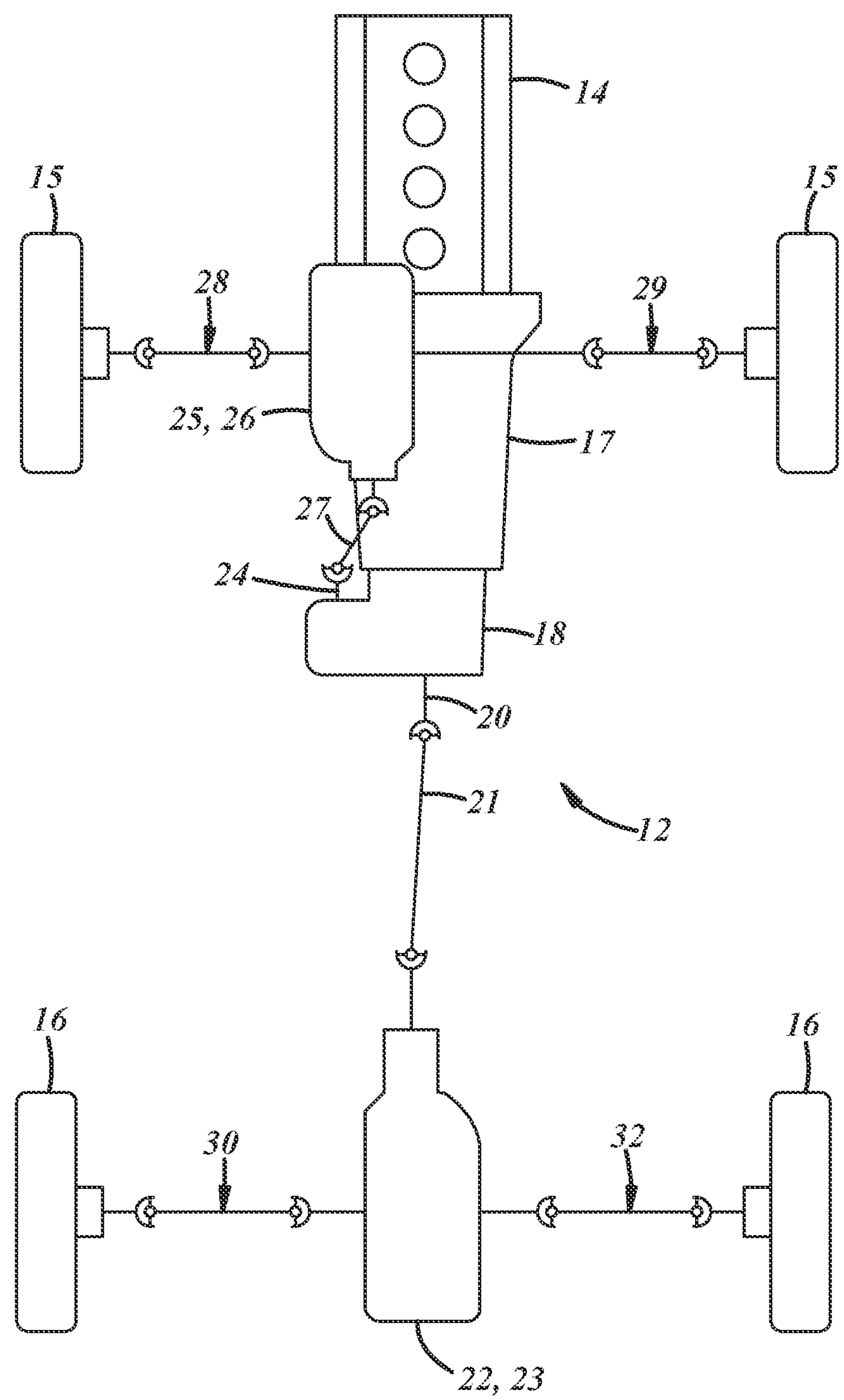
FIG. 1 is a schematic diagram of a vehicle driveline assembly.

Referring in more detail to the drawings, FIG. 1 illustrates a vehicle driveline 12 that provides power from an engine 14 to multiple wheels including front wheels 15 and rear wheels 16. The engine 14 supplies torque via a transmission 17 and a power transfer unit 18 that provides an output shaft 20. The output shaft 20 is coupled to a first prop shaft 21 which is coupled to a rear drive unit 22 that may include a differential assembly 23. The power transfer unit 18 or other device may have an output shaft 24 coupled to a front drive unit 25 (which may include a differential assembly 26) via a second prop shaft 27. Front left and right side shafts 28, 29 are coupled to the drive unit/differential 25, 26 which permits relative rotation between the side shafts 28, 29 and front wheels 15. Rear left and right side shafts 30, 32 are coupled to the rear drive unit/differential 22, 23 which permits relative rotation between the side shafts 30, 32 and rear wheels 16. The power transfer unit 18 may include a disconnect assembly that, when in a connected state, transfers torque to the second prop shaft 27 to drive the front wheels 15. When connected or disconnected, the power transfer unit 18 may provide torque to the first prop shaft 21 to drive the rear wheels 16. Thus, depending upon the state of the disconnect device, the driveline 12 may provide torque to the rear wheels 16 only or to all four of the wheels 15, 16. Of course, other driveline configurations may be used, as desired.

Figure 2:
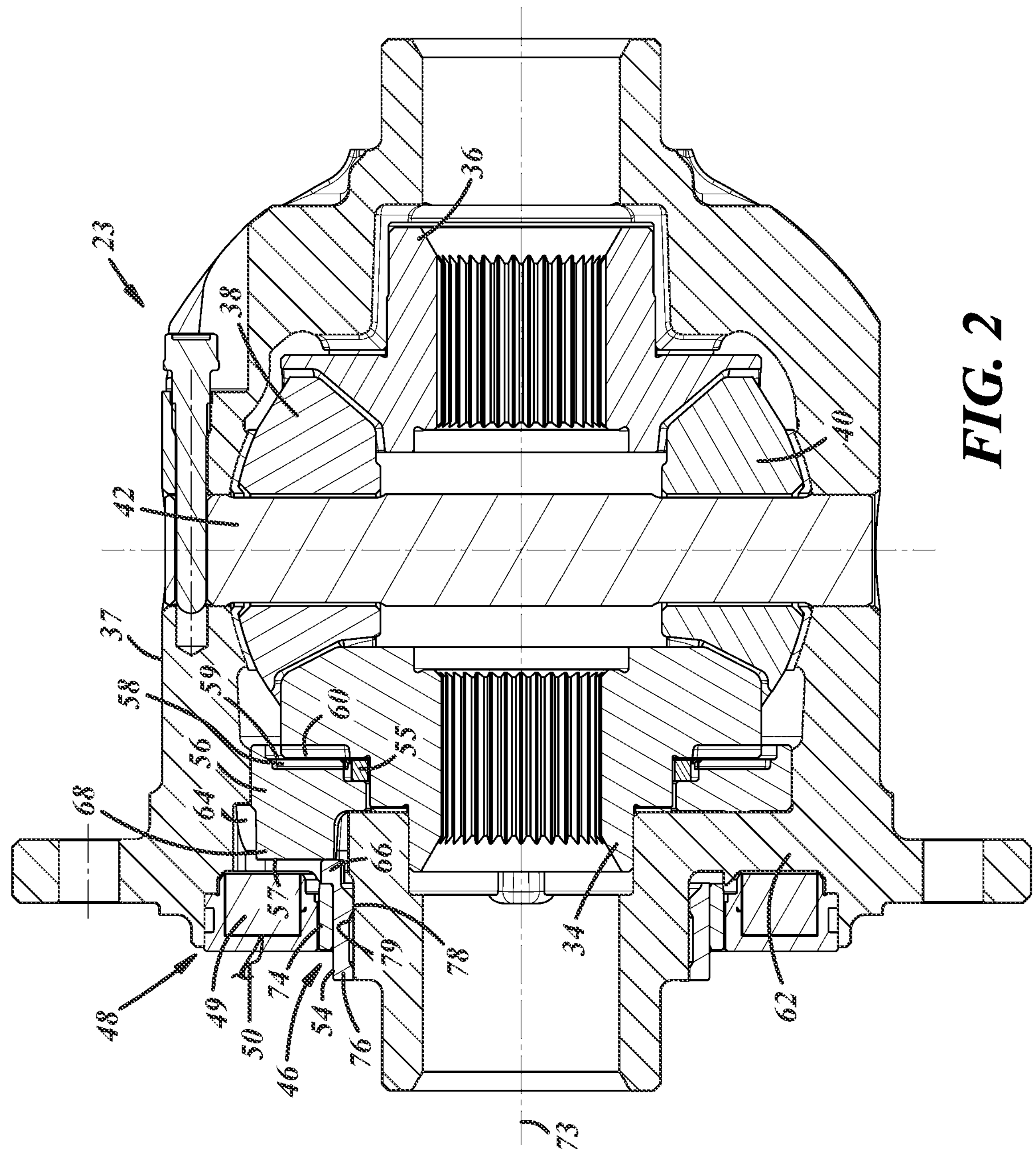
FIG. 2 is a cross-sectional view of a differential with an electrically actuated clutch, wherein the differential is shown in an open position.

Referring now to FIG. 2, the first rear side shaft 30 is connected to a first side gear 34 within the differential 23. Similarly, the second rear side shaft 32 is connected to a second side gear 36 within the differential 23. The side gears 34, 36 are carried within a housing 37 of the differential 23. The differential also includes pinion gears 38, 40 that are meshed with side gears 34, 36, respectively, and which are mounted within the housing 37 on a pinion shaft 42.

To selectively lock and unlock the differential 23 a clutch assembly 46 is provided. The clutch assembly 46 may have actuated and deactuated states, and in one state the clutch assembly couples one of the side shafts (e.g. 32) to the differential housing 37 so that the coupled side shaft rotates with the housing. This, in turn, causes the other side shaft 30 to rotate in unison with the housing 37 and the side shaft 32 coupled to the housing so that both side shafts 30, 32 rotate at the same speed.

In at least some implementations, the clutch assembly 46 is electrically actuated and includes a solenoid 48 having an annular wire coil 49 and a drive member that may include an armature or plunger 54 received at least partially radially inwardly of and axially overlapped with the coil. In at least some implementations, the plunger 54 is also annular, the plunger and coil 49 are coaxially arranged and carried by the housing 37 for rotation with the housing, and one side shaft (here, the second side shaft 32) extends coaxially through a portion of the housing 37 that extends through the coil and plunger. Electric power is supplied to the coil 49 via a power wire 50 to generate a magnetic field that displaces the plunger 54 relative to the coil and differential housing 37 from a first or retracted position to a second or advanced position. To facilitate return of the plunger 54 from the second position back to the first position when power is not provided to the coil 49, a biasing member, such as a spring 55 may act on the plunger 54, or on a component engaged with the plunger, as set forth below. In at least some implementations, the clutch assembly 46 is actuated when the plunger 54 is in the second position and the clutch assembly is deactuated when the plunger is in the first position. While in the example shown the plunger 54 is in its second position when power is provided to the coil 49 and the plunger moves to the first position when power is not supplied to the coil, the opposite could be true if desired (e.g. the clutch assembly 46 could be moved to the actuated position by the biasing member 55 and deactuated by powering the coil).

In at least some implementations, the clutch assembly 46 may further include or be associated with a clutch member, called herein a clutch ring 56 adapted to be driven by the plunger 54 and to interface with the side gear 34 as set forth below. The clutch ring 56 may be annular and a portion of the second side gear 36 and/or shaft 32 may extend through the clutch ring. The clutch ring 56 may include a rear face 57 engageable by the plunger 54 and a front face 59 having at least one engagement feature 58, such as gear or clutch teeth 58 (e.g. dog clutch teeth) configured to engage a corresponding engagement feature 60 (e.g. gear or dog clutch teeth) formed on a rear face of the first side gear 34. The spring 55 may act on the clutch ring 56 to urge the clutch ring into the plunger 54 and move the plunger to its first position when the coil 49 is not powered, as noted above. In the implementation shown, the plunger 54 is located adjacent to one side of a housing wall 62 and the clutch ring 56 is located adjacent to the other side of the wall 62. The wall 62 includes apertures 64, and the plunger 54 and clutch ring 56 include axially extending feet 66, 68 (e.g. FIGS. 2 and 3), respectively, that extend into or through the apertures 64 in the wall so that the plunger and clutch ring are engaged with each other across or through the wall. Like the coil 49 and plunger 54, the clutch ring 56 also is carried by and rotates with the housing 37.

The differential 23 illustrated in FIG. 2 is shown in an open mode or position. In the illustrated implementation, in the open position of the differential, the coil 49 is not powered, the plunger 54 is in its first position and the clutch ring 56 is not engaged with the side gear 34 so that the side gear can rotate relative to the clutch ring 56 and housing 37. In the open position, the side shafts 30, 32 may rotate at different speeds from one another. However, certain driving conditions may make it desirable for the side shafts 30, 32 to rotate in unison such that torque is applied to both wheels.

In the locked position, the coil 49 is powered, the plunger 54 is advanced to its second position which drives the clutch ring 56 into engagement with the side gear 34 (i.e. teeth 58 engage and mesh with teeth 60). Hence, the side gear 34 is coupled to the housing 37 so that the side gear rotates with and not relative to the housing. In effect, the second side shaft 32 is locked to and rotates with the housing 37, which in turn forces the first side shaft 30 and the second side shaft 32 to rotate in unison.

As shown in FIGS. 2-8 and 10, the plunger 54 may be formed from multiple materials including a material that is magnetically responsive to the magnetic field generated by the coil 49, and at least one other material that may or might not be responsive to the magnetic field. Thus, when the magnetic field is generated by the coil 49, the plunger 54 may be driven from one position to another (e.g. from the retracted to the advanced position). As used herein, a material is responsive to a magnetic field if a magnetic field of the magnitude generated by a solenoid 48 of the type used in applications such as that described herein, may cause a component formed of or including such material to be displaced.

Figure 3:
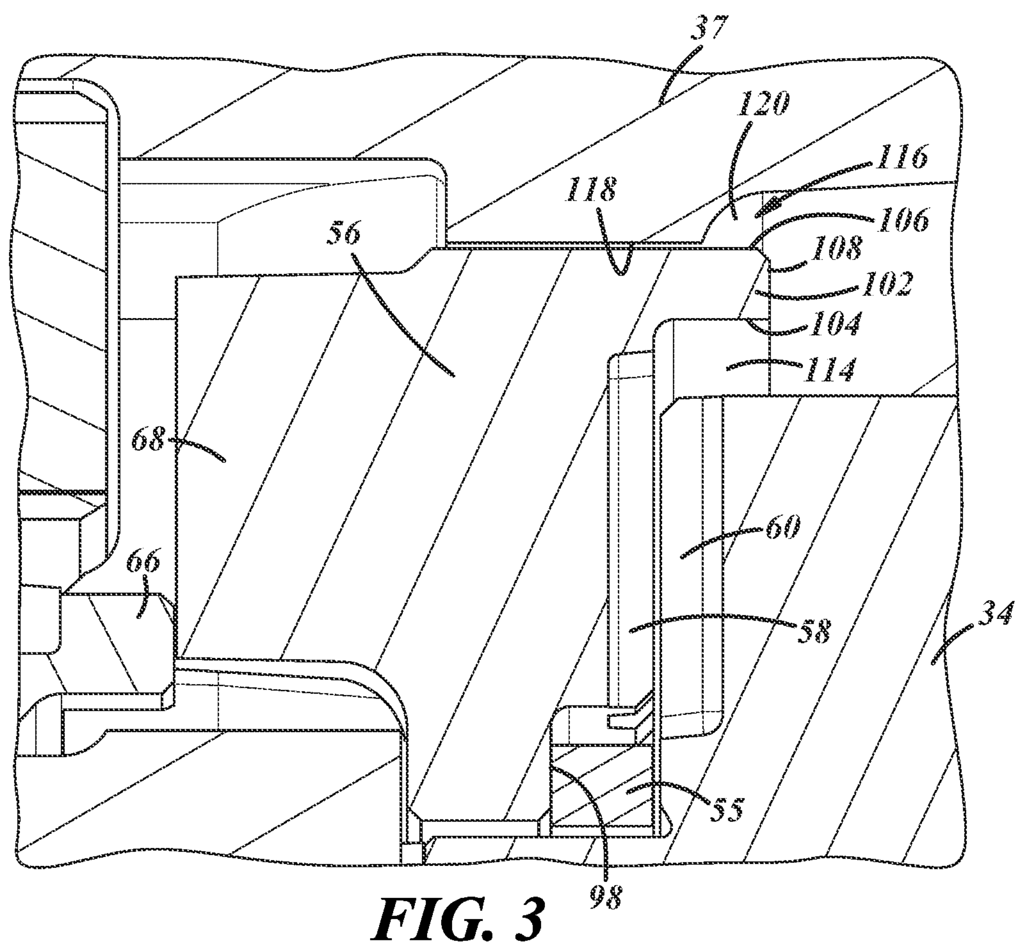
FIG. 3 is a fragmentary sectional view of a portion of the clutch showing a clutch ring.

In at least some implementations, as shown in FIG. 3, the plunger 54 includes a main body 72 with a central axis 73 and which may be defined by a first body 74 and a second body 76 that are coupled together and move as one unit or component and are not separated during use. The first body 74 may be formed from a magnetically responsive material and may be received adjacent to and radially inwardly of the coil 49, with a small air gap between them. The second body 76 may have at least a portion that is radially inward of at least a portion of the first body 74. The second body 76 may be annular and may, in at least some implementations, radially overlap part of the first body 74. The second body 76 may be conveniently overmolded onto the first body 74 to facilitate forming the second body and connecting together the first and second bodies, however other forming processes such as but not limited to casting, stamping or extruding may be used. The second body 76 may define part or all of the feet 66 of the plunger 54 which may extend axially beyond the first body 74, if desired. The second body 76 may be formed from a material that is not magnetically responsive (e.g. plastic, aluminum, stainless steel, etc.), and may provide a magnetic flux shield of sorts that improves the magnetic field strength on or in the area of the first body 74 to ensure proper response of the plunger 54 when the coil 49 is energized. In this way, the magnetic field is more concentrated or stronger in the area of the first body 74 to increase the magnetic flux at or in the first body and improve the responsiveness of the plunger 54 to the generated magnetic field.

As shown in FIG. 2, the second body 76 may have an inner surface 78 that is received adjacent to or around a surface 79 of the differential housing 37. The inner surface 78 may define a pilot diameter for receipt of the plunger 54 over the annular surface 79 of the differential housing 37 for guided linear, axial movement of the plunger relative to the differential housing.

Figure 4:
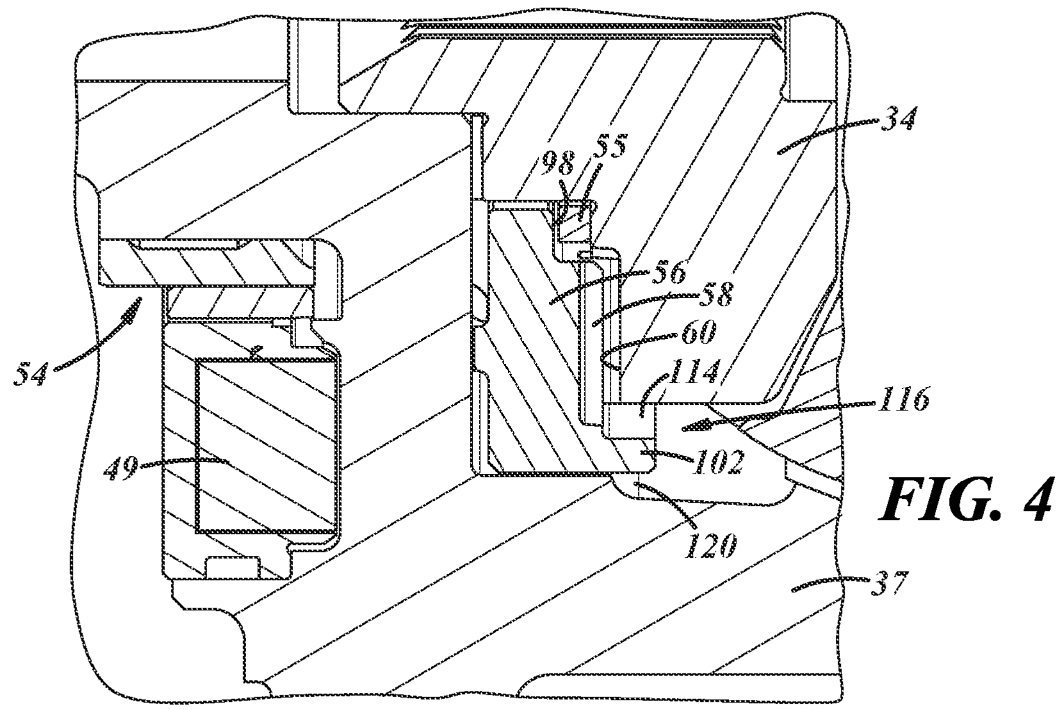
FIG. 4 is a fragmentary sectional view of a portion of the clutch showing a clutch ring.
Figure 5:
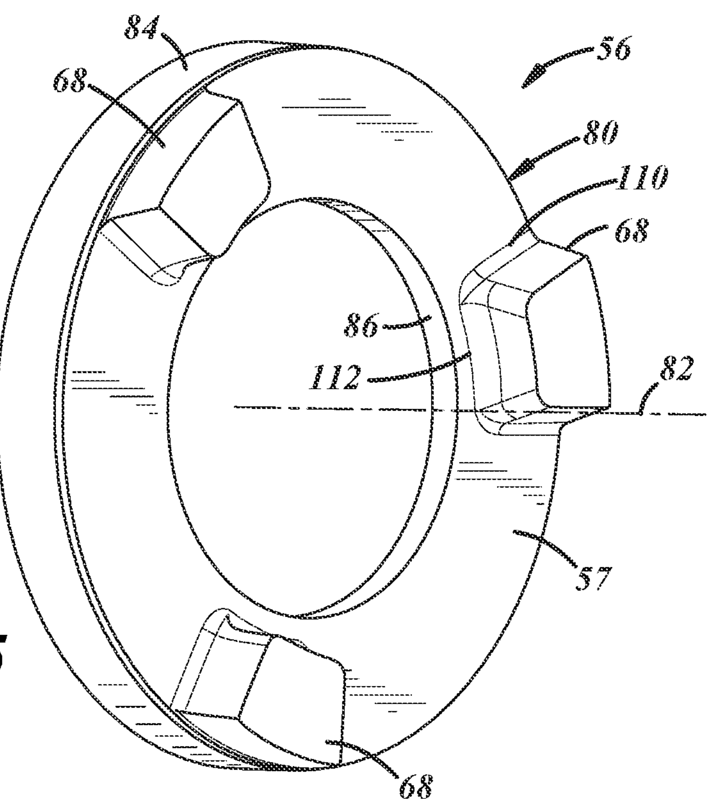
FIG. 5 is a perspective view of the back of the clutch ring.
Figure 6:
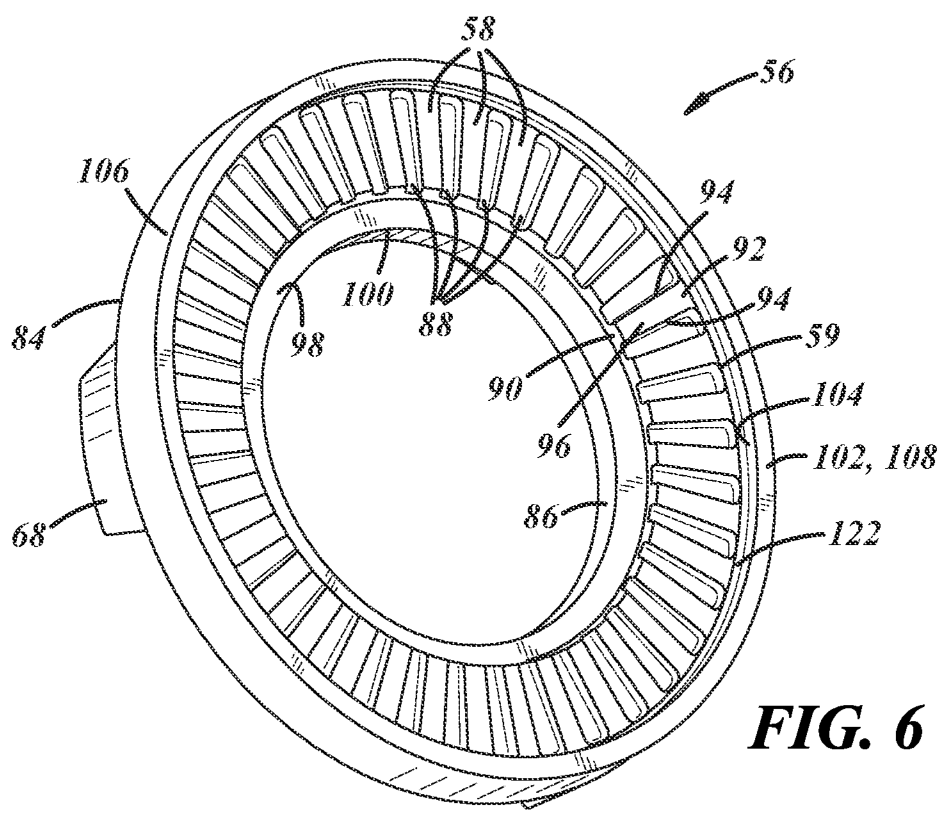
FIG. 6 is a perspective view of the front of the clutch ring.

Referring to FIGS. 5 and 6, the clutch ring 56 has a main body 80 with a central axis 82 which may be coaxial with the axis 73 of the plunger 54, a radially outer surface 84 that extends axially between the rear face 57 (FIG. 5) and the front face 59 (FIG. 6), and a radially inner surface 86 that may have a lesser axial extent than the outer surface 84. The inner surface 86 of the clutch ring 56 may be received around a surface of the side gear 34, as shown in FIGS. 2-4. The feet 68 of the clutch ring 56 are circumferentially spaced apart and extend axially from the rear face 57, and the teeth 58 are located on the front face 59. The clutch ring 56 may be made from metal, such as alloy steel, chromium steel, chromium molybdenum steel, nickel steel, nickel chromium molybdenum steel, mid/high carbon steel, etc.

Figure 7:
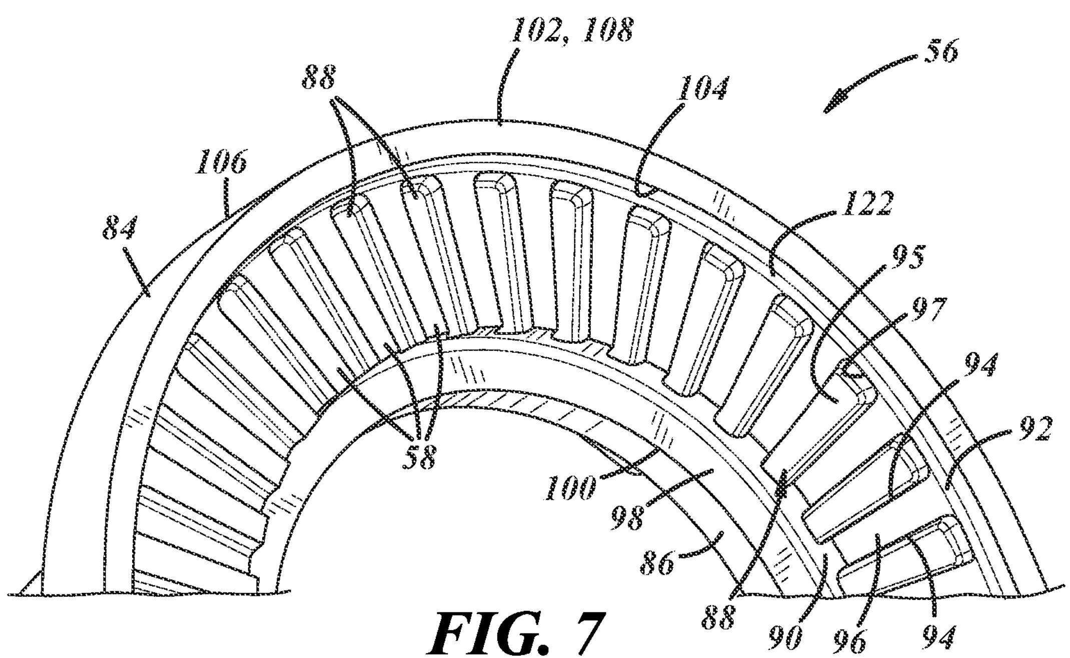
FIG. 7 is an enlarged perspective view of part of the clutch ring.
Figure 8:
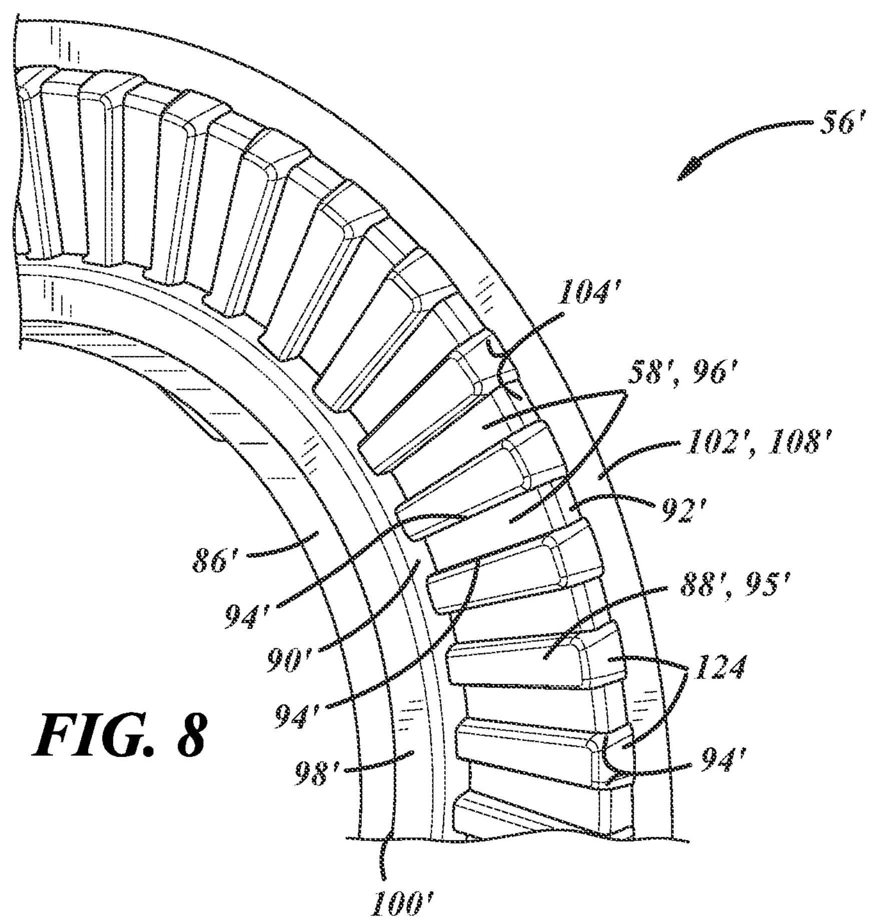
FIG. 8 is an enlarged perspective view of part of a second clutch ring.

As shown in FIGS. 6 and 7, the clutch ring teeth 58 are separated from each other and defined at least in part by grooves 88 formed in the front face 59, arranged at even intervals in the circumferential direction, and with each tooth 58 located circumferentially between two grooves 88. The teeth 58 extend radially from a radially inner edge 90 to a radially outer edge 92. The teeth 58 have opposite, circumferentially spaced apart side surfaces 94 that extend axially and radially between the inner edge 90 and outer edge 92, and the teeth 58 have front faces 96 that extend radially and circumferentially between the inner edge 90 and outer edge 92. So arranged, each groove 88 extends radially and circumferentially between two adjacent teeth 58, and the grooves have a bottom wall 95 that may be parallel to and recessed relative to the front face 96 of the teeth 58, and the grooves 88 have an end wall 97 at the radially outer end of the grooves 88. The radial distance between the inner edge 90 and outer edge 92 defines a length of each tooth 58, the circumferential extent between the side surfaces 94 defines a width of each tooth 58, and the axial extent of the side surfaces 94 defines a thickness of each tooth 58. With radially oriented sides, the width of each tooth 58 varies along its length, and increases from the inner edge 90 to the outer edge 92. Further, the side surfaces 94 may be radially oriented so that the front face 96 of each tooth 58 is less wide than is a base of each tooth that is opposite the front face 96 and which joins the main body 80 (e.g. at the bottom of the adjacent grooves 88). In at least some implementations, the front faces 96 of the teeth 58 may lie in a common plane, that is, each tooth 58 may have the same thickness along its length, and each tooth 58 may have the same thickness as the other teeth. The plane may be perpendicular to the central axis 82.

In at least some implementations, the inner edges 90 of the teeth 58 are radially outwardly spaced from the inner surface 86 of the main body 80, and the inner surface 86 of the main body 80 defines a minimum diameter of the clutch ring 56 and does not axially overlap the teeth 58. In such an arrangement, an annular, radially extending and axially recessed surface 98 extends from an edge 100 of the inner surface 86 of the main body 80 to the base of the inner edge 90 of the teeth 58. This surface 98 may be engaged by the spring 55, which may be received between this surface 98 and an opposed surface of the side gear 34. Of course, other arrangements are possible and the teeth 58 may extend to the inner surface 86 of the main body 80 or be otherwise shaped, as desired.

Radially outwardly of the outer edge 92 of the teeth 58, the clutch ring 56 may include a rim 102. In at least some implementations: a radially inner surface 104 of the rim 102 extends radially from or adjacent to the outer edge 92 of the teeth 58 to the outer surface 84 of the main body 80; an outer surface 106 of the rim 102 may be radially aligned with and define part of the outer surface 84 of the main body 80; the rim 102 may be circumferentially continuous; and a front surface 108 of the rim 102 is axially farther from the rear face 57 of the clutch ring 56 than are the front faces 96 of the teeth 58. The front surface 108 of the rim 102 extends radially and circumferentially, and may be planar and perpendicular to the central axis 82, or inclined at an angle that is 45 degrees or less to a plane perpendicular to the central axis.

So arranged, the rim 102 extends axially forward of the teeth 58, and when the clutch ring 56 is assembled into the differential 23, the rim 102 extends axially farther toward the side gear 34 than do the teeth 58 of the clutch ring 56. With the rim 102, the clutch ring 56 is stronger than a clutch ring 56 lacking an axially extending rim 102. In use of the device, significant stresses occur at the base 110 (shown in FIG. 5) of the feet 68 on the rear face 57 of the clutch ring 56, at the radiused transition from the feet 68 to the rear face 57 of the clutch ring 56, with highest stress levels often occurring near the radially inner edge 112 of the base 110 of the feet 68. These stresses can be reduced and better accommodated by the stronger clutch ring 56 with the axially extending rim 102 without having to increase the axial thickness of the main body 80 of the clutch ring 56. This makes the clutch ring 56 more durable and also enables the clutch ring 56 to fit within a smaller area of the housing 37 and to be lighter than a clutch ring 56 with an axially thicker main body. This also enables the clutch ring 56 to be used in higher torque applications without a corresponding increase in the size and weight of the clutch ring 56. In one such clutch ring 56 with an axially extending rim 102, the stresses at the base 110 of the feet 68 were reduced by over 20% compared to a clutch ring without the axially extending rim 102.

In at least some implementations, the rim 102 may axially overlap (and be radially outward of) a portion of the side gear 34 in both the first position and second position of the clutch ring 56. That is, as shown in FIGS. 3 and 4, when engaged with the side gear 34 and when disengaged from the side gear 34, the rim 102 may axially overlap part of the side gear 34. This overlap creates a space 114 between the rim 102 and the side gear 34 and lubrication within the housing 37 may enter this space 114 and be retained by the rim 102 to enhance lubrication of the front face 59 of the clutch ring 56, the opposed face of the side gear 34 and adjacent components such as the spring 55.

The rim 102 may extend into an area 116 between the side gear 34 and the housing 37, and beyond an adjacent surface 118 of the housing 37 that provides a minimum radial clearance between the housing 37 and the clutch ring 56, and by which the axial movement of the clutch ring 56 may be guided (such movement could also or instead by guided by the radially inner surface of the clutch ring). In this way, a gap 120 greater in radial dimension than the minimum radial clearance between the housing 37 and the clutch ring 56 is defined between the rim 102 and part of the housing 37. This gap 120 exists at least when the clutch ring teeth 58 are engaged with the side gear teeth 60, and may also exist when the clutch ring 56 is disengaged from the side gear 34, as shown in FIGS. 3 and 4. Some lubrication within the housing 37 may collect in that gap 120 and may flow between the outer surface 84 of the clutch ring 56 and the housing surface 18, to improve lubrication of the clutch ring 56 and facilitate movement of the clutch ring 56 relative to the housing 37. Further, the increased axial length of the outer surface 84 of the clutch ring 56 provides a longer guide surface for axial movement of the clutch ring 56 and reduces any tilting of the clutch ring 56 to maintain the clutch ring coaxial with the side gear 34 and the front face 59 of the clutch ring 56 perpendicular to the axis 82. In at least some implementations, the outer surface 84 of the main body 56 may be longer axially than is the surface 118 of the housing 37 that provides the minimum radial clearance between the housing 37 and the outer surface 84 of the clutch ring 56.

In the example shown in FIGS. 6 and 7, the grooves 88 between the teeth 58 do not extend to the radially inner surface 104 of the rim 102 and an annular, radially extending intermediate surface 122 is located between the teeth 58 and the rim 102. In the example clutch ring 56' shown in FIG. 8, the grooves 88' between the teeth 58' extend all the way to the radially inner surface 104' of the rim 102', and the grooves 88' also extend axially to the front surface 108' of the rim 102'. The radially inner surface 104' of the rim 102', in at least some implementations, varies in its radial distance from the central axis 82 with portions of the inner surface 104' defined by the grooves 88' being radially farther from the axis 82 than portions of the inner surface 104' radially aligned with the teeth 58'. Stated differently, each groove 88' has a radially outer end 124 that extends axially from the front surface 108' of the rim 102' to the radially extending base 95' of the groove 88' between adjacent teeth 58'. In this example, the front faces 96' of the teeth 58' may merge, at the radially outer edge 92' of the front faces 96', with the inner surface 104' of the rim 102 which extends axially to the front faces 96' of the teeth 58' in the areas of the rim 102' aligned with the teeth 58'. The radially outer end 124 of the grooves 88' define side surfaces 94' of the teeth 58' that extend radially farther from the axis 82 than do the front faces 96' of the teeth 58' and axially along the portions of the inner surface 104' of the rim 102' that are radially aligned with the teeth 58'. The cam ring 56' may be used and may function in the same way as the cam ring 56.

In at least some implementations, the rim 102, 102' may extend axially beyond the teeth 58, 58' by an amount up to five times the thickness of the rim, and in some implementations, between two and five times, where the thickness is the radial dimension of the rim (e.g. outer diameter minus inner diameter). The inner diameter may be measured at the base of the rim or at the radially outer edge 92, 92' of the teeth 58, 58' (e.g. the inner diameter may include a surface like the intermediate surface 122). The extent to which the rim 102, 102' extends axially beyond the teeth 58, 58' may be limited by adjacent components wherein the rim 102, 102' may be sized so as to not engage adjacent components as the clutch ring 56, 56' moves in use. In at least some implementations, the axial extent of the rim 102, 102' may be equal to or less than the axial extent of the outer surface 84 from the rear face 57 to the front face 96, 96' of the teeth 58, 58'. Further, the rim 102, 102' may have any desired radial thickness that fits within the area in which the clutch ring 56, 56' is received. That is, without undue interference to movement of the clutch ring 56, 56' due to engagement with a component at the radial outer and inner surfaces 84, 86 of the clutch ring.

Although the above descriptions relate to a locking differential device, other rotary power transmission devices, such as power take-off units or axle disconnects, could utilize a clutch with a clutch ring as described herein. Further, the forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

All terms used in the claims are intended to be given their broadest reasonable construction and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The invention claimed is:

1. A clutch member, comprising:
- a main body having a central axis, a radially inner surface, a radially outer surface, a rear face and a front face;
- multiple teeth formed in the front face with adjacent teeth circumferentially spaced apart; and
- a rim extending axially from the main body and located radially outwardly of the teeth, the rim extending axially farther from the rear face than do the teeth and wherein an annular, radially extending intermediate surface is located between the teeth and the rim, and the intermediate surface is at the same axial height as the radially outer edge of the teeth.

2. The clutch member of claim 1, wherein the main body includes multiple feet that extend axially from the rear face.

3. The clutch member of claim 1 wherein the teeth are defined between adjacent grooves formed in the front face.

4. The clutch member of claim 3 wherein the grooves extend to a radially inner surface of the rim.

5. The clutch member of claim 1 wherein the rim is circumferentially continuous.

6. The clutch member of claim 1 wherein a radially outer surface of the rim is radially aligned with and defines part of the radially outer surface of the main body.

7. The clutch member of claim 1 wherein a front surface of the rim extends radially and circumferentially, and is planar and either: a) perpendicular to the central axis, or b) inclined at an angle that is 45 degrees or less to a plane perpendicular to the central axis.

8. The clutch member of claim 1 wherein the rim extends axially beyond the teeth by an amount up to five times the thickness of the rim, where the thickness of the rim is the radial dimension of the rim.

9. The clutch member of claim 1 wherein an axial extent of the rim is equal to or less than an axial extent of the radially outer surface of the main body from the rear face to the front face of the teeth.

10. A rotary power transmission device, comprising:

a housing having an interior in which multiple gears are received for rotation;

an actuator having a plunger driven for movement along an axis of the plunger between advanced and retracted positions;

a clutch assembly including a clutch ring having a front face and a rear face opposite the front face, the front face including teeth selectively engageable with teeth of one of the gears, the clutch ring being driven by the plunger between a first position in which the teeth of the clutch ring are engaged with the teeth of the gear, and a second position in which the teeth of the clutch ring are not engaged with the teeth of the gear, and wherein the clutch ring includes a rim extending axially from the main body and located radially outwardly of the teeth, the rim extending axially farther from the rear face than do the teeth, and wherein an annular, radially extending intermediate surface is located between the teeth and the rim, and the intermediate surface is at the same axial height as the radially outer edge of the teeth.

11. The device of claim 10, wherein the main body includes multiple feet that extend axially from the rear face.

12. The device of claim 10 wherein the teeth are defined between adjacent grooves formed in the front face.

13. The device of claim 12 wherein the grooves extend to a radially inner surface of the rim.

14. The device of claim 10 wherein the rim is circumferentially continuous.

15. The device of claim 10 wherein a radially outer surface of the rim is radially aligned with and defines part of the outer surface of the main body.

16. The device of claim 10 wherein a front surface of the rim extends radially and circumferentially, and is planar and either: a) perpendicular to the central axis, or b) inclined at an angle that is 45 degrees or less to a plane perpendicular to the central axis.

17. The device of claim 10 wherein the rim extends axially beyond the teeth by an amount up to five times the thickness of the rim, where the thickness of the rim is the radial dimension of the rim.

18. The device of claim 10 wherein said multiple gears include a side gear and a pinion gear that are mated together, and wherein the side gear rotates about the central axis and the rim axially overlaps a portion of the side gear in the both the first position and the second position of the clutch ring.

* * * * *